United States Patent [19]

Naito

[11] 4,150,324

[45] Apr. 17, 1979

[54] SPEED CONTROL SYSTEM OF TRACTION MOTOR FOR ELECTRIC VEHICLES

[75] Inventor: Shotaro Naito, Katsuta, Japan

[73] Assignee: Hitachi, Ltd., Japan

[21] Appl. No.: 795,508

[22] Filed: May 10, 1977

[30] Foreign Application Priority Data

May 19, 1976 [JP] Japan .................................. 51-56572
Jul. 7, 1976 [JP] Japan .................................. 51-89248

[51] Int. Cl.² .............................................. H02P 5/00
[52] U.S. Cl. .................................... 318/139; 318/341; 318/345 F; 318/345 G; 318/434
[58] Field of Search ................ 318/139, 341, 430, 434, 318/345 R, 345 F, 345 G

[56] References Cited

U.S. PATENT DOCUMENTS

| | | | |
|---|---|---|---|
| 3,596,162 | 7/1971 | Takayama | 318/341 |
| 3,743,911 | 7/1973 | Erler | 318/341 |
| 3,783,360 | 1/1974 | Bundy | 318/341 |
| 3,875,486 | 4/1975 | Barton | 318/341 |
| 3,883,786 | 5/1975 | McNaughton et al. | 318/341 |
| 3,914,672 | 10/1975 | Kiwaki et al. | 318/341 |
| 4,066,934 | 1/1978 | Waldorf et al. | 318/341 |

Primary Examiner—Robert K. Schaefer
Assistant Examiner—Eugene S. Indyk
Attorney, Agent, or Firm—Craig & Antonelli

[57] ABSTRACT

A speed control system of traction motors for electric vehicles comprises a traction motor for causing an electric vehicle to run, a D.C. supply source for supplying voltage to the traction motor, a chopper for chopping the voltage fed from the D.C. supply source to the motor, and a chopper control circuit for controlling the operation of the chopper. The chopper control circuit comprises a circuit for producing a saw-tooth wave signal, a comparator which compares an accelerator signal, whose level is varied with the speed control operation by means of an accelerator pedal of the electric vehicle, with a saw-tooth wave signal from the saw-tooth wave signal generator circuit to produce a rectangular wave signal having a width proportional to the accelerator signal, and a circuit for producing pulse signals at the rise of the rectangular wave signal and at the fall thereof, respectively. The chopper starts to apply the voltage by one of the pulse signals produced in response to the rising rectangular wave signal and interrupts the voltage by the other pulse signal produced in response to the falling rectangular wave signal.

2 Claims, 6 Drawing Figures

SPEED CONTROL SYSTEM OF TRACTION MOTOR FOR ELECTRIC VEHICLES

BACKGROUND OF THE INVENTION

This invention relates to a speed control system of traction motors for electric vehicles and more particularly, to a chopper control circuit for use in a speed control system of traction motors wherein a controllable chopper is employed to intermittently switch a D.C. voltage to be supplied to the traction motor.

The chopper for chopping the D.C. voltage fed to the traction motor usually comprises a thyristor which is controllable by a pulse for initiating its conduction and a pulse for stopping its conduction. Usually, these pulses are formed from a pulse produced by a monostable multivibrator. This monostable multivibrator is controlled by a periodical pulse produced by a pulse generator circuit.

It is necessary for the monostable multivibrator used for chopper control to control the chopper such that the duty factor of the D.C. voltage fed to the traction motor is controlled by the chopper with extremely high accuracy. Typically, a monostable multivibrator for this purpose is constituted with a pair of transistors. Such a monostable multivibrator suffers from failure of accurate control for the duty factor since transistors are sensitive to temperature and ambient disturbance and for this reason, they are unstable. In addition, with the monostable multivibrator utilizing paired transistors, it is impossible to reduce the reset time below a certain limit with the result that the control for the duty factor is confined within a narrow range.

SUMMARY OF THE INVENTION

Accordingly, an object of the invention is to provide a speed control system of traction motors for electric vehicles wherein the duty factor of the D.C. voltage fed to the traction motor is controlled by a stably operative monostable multivibrator which is immune to temperature and ambient disturbance.

Another object of the invention is to provide a speed control system of traction motor for electric vehicles using a monostable multivibrator capable of controlling the duty factor of the D.C. voltage fed to the traction motor to a great extent.

Still another object of the invention is to provide a speed control system of traction motor for electric vehicles wherein the duty factor of the D.C. voltage is controlled such that when the D.C. current flowing through the traction motor reaches a predetermined limit value, the D.C. current is decreased thereby to prevent an excessive current flowing through the traction motor.

Still another object of the invention is to provide a speed control system of traction motors for electric vehicles wherein the traction motor can readily be controlled to operate at a low speed.

DESCRIPTION OF THE PREFERRED EMBODIMENT

Figure 1:
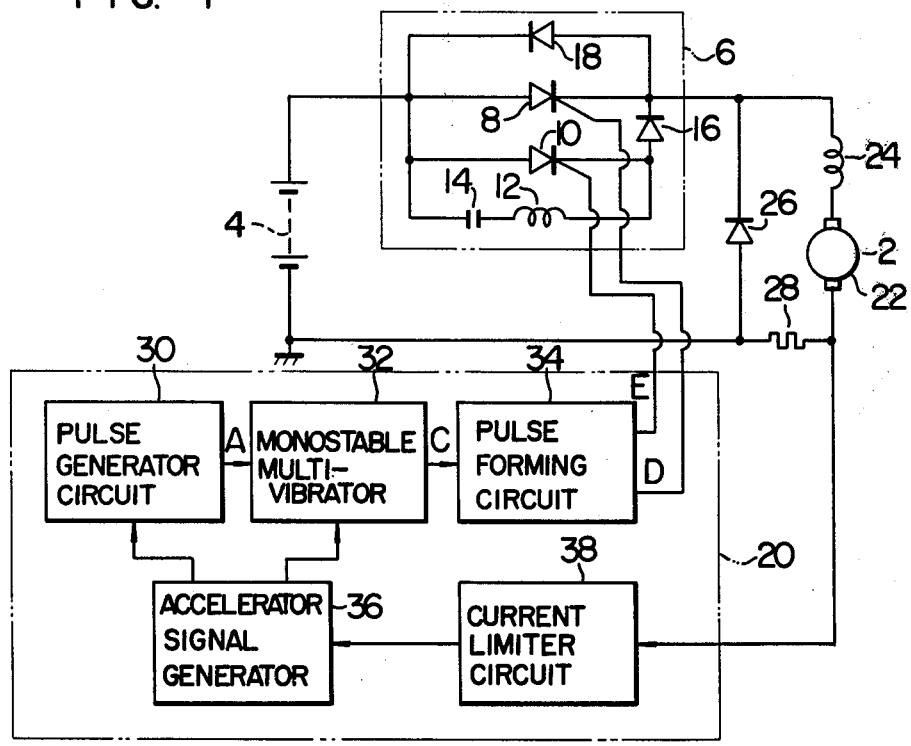
FIG. 1 is an overall schematic diagram showing an embodiment of the invention.

FIG. 1 shows an overall system for controlling the speed of a traction motor for electric vehicles, in which a traction motor 2 is fed with a D.C. voltage from a D.C. main source 4 via a chopper 6. The chopper 6 comprises a thyristor 8 for switching the D.C. voltage which is supplied to the traction motor 2, a thyristor 10 for interrupting the conduction of the thyristor 8, a series resonance circuit including a series connection of a commutating reactor 12 and a commutating capacitor 14 which are in parallel with the thyristor 10, and diodes 16 and 18. The thyristor 8 is designed to be turned on by a pulse which is fed to its gate from a chopper control circuit 20 and initiates the voltage supply to the motor 2. The thyristor 10 is designed to be turned on by a pulse from the chopper control circuit 20 such that the series resonance circuit of the reactor 12 and capacitor 14 is activated. The series resonance circuit produces a counter electromotive force by the energy stored therein and the thyristors 8 and 10 are turned off by the counter electromotive force. The diode 18 serves to rapidly discharge the energy stored in the resonance circuit in order that the resonance circuit is in readiness for steady response to a subsequent pulse from the chopper control circuit 20. The diode 16 makes lower the cathode potential of thyristor 10 than the anode potential so that the application of current to the resonance circuit is ensured when the thyristor 10 is turned on.

The chopper 6 would supply intermittent D.C. voltage to an armature 22 and a field coil 24 of the motor 2 but the current to be passed through the motor 2 is smoothed by the free-wheel diode 26. This current flowing through the motor 2 is detected as a voltage across a resistor 28 connected in series with the motor 2.

Figure 2:
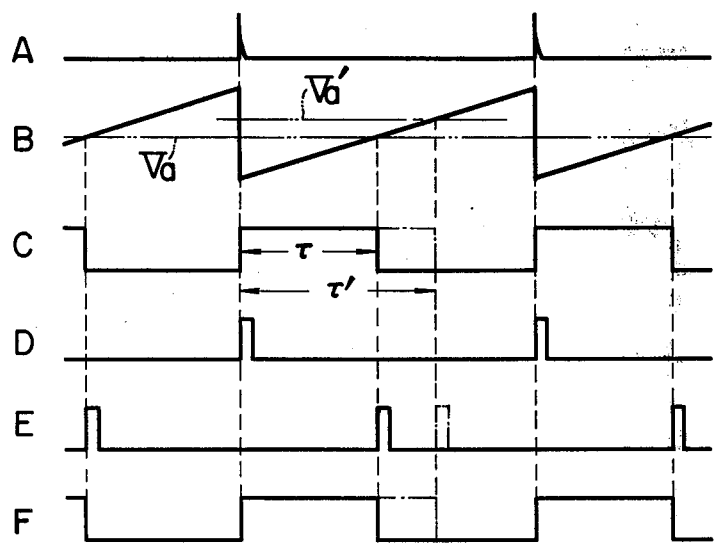
FIG. 2 is a waveform diagram showing waveforms at essential parts in FIG. 1.

The chopper control circuit 20 comprises a pulse generator circuit 30 for generating a pulse A occurring at a predetermined period as shown in FIG. 2, a monostable multivibrator 32 for producing a rectangular wave signal C having a desirable pulse width in response to the pulse A, a pulse forming circuit 34 for producing a pulse D to be fed to the gate of thyristor 8 in response to the rising of rectangular wave signal C and a pulse E to be fed to the thyristor 10 in response to the falling of rectangular wave signal C, an accelerator signal generator 36 for producing two D.C. output signals whose level varies dependent on the amount of depression of the accelerator pedal, one of which output signals is supplied to the monostable multivibrator 32 to vary the pulse width $\tau$ of the rectangular wave signal C and the other of which output signal is supplied to the pulse generator circuit 30 to vary the period for the pulse A, and a current limiter circuit 38 acting, when the voltage across the resistor 28 exceeds a predetermined value, to decrease the level of the two output signals from the accelerator signal generator 36 thereby to limit the current flowing through the motor 2.

Figure 3:
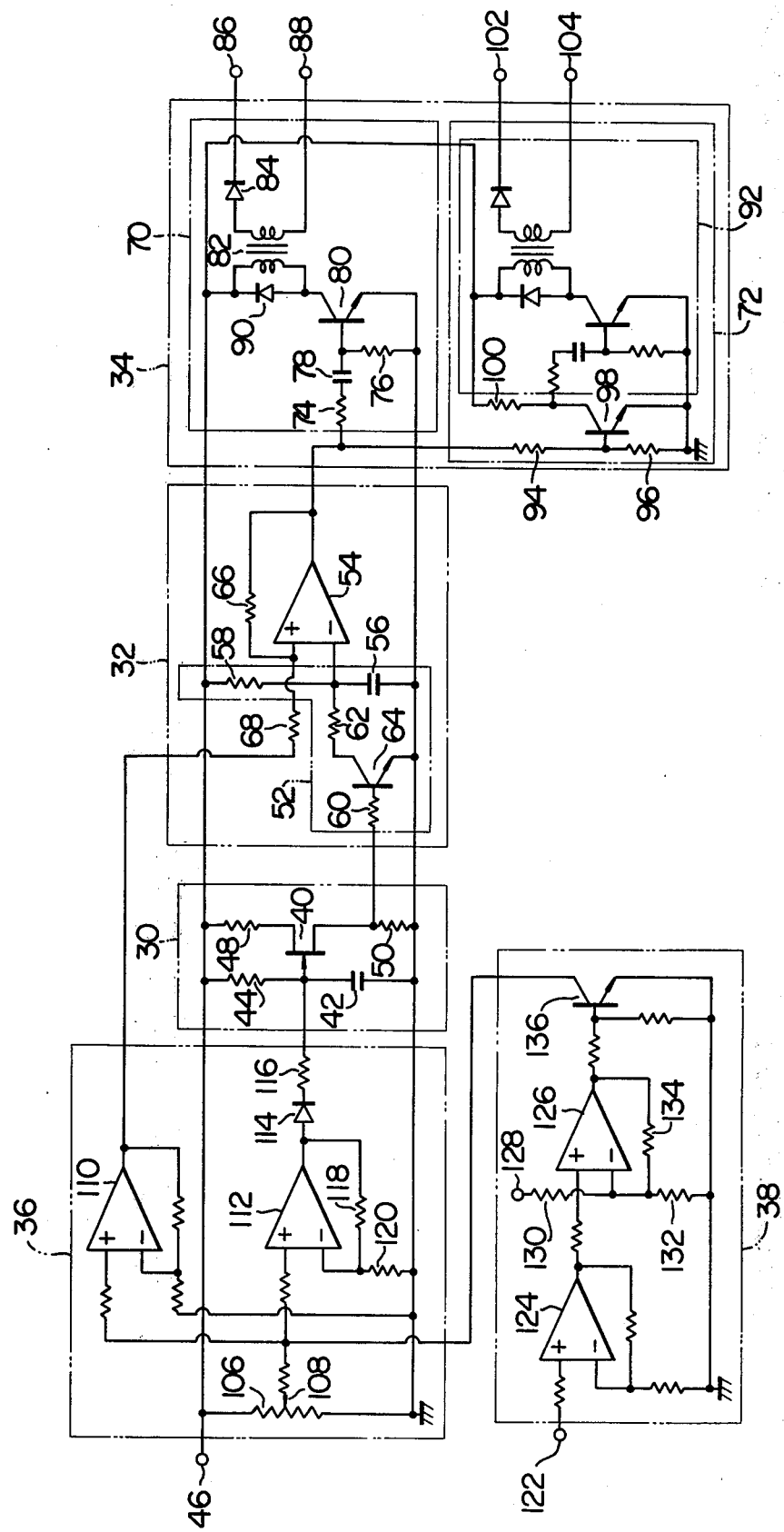
FIG. 3 is a circuit diagram of a chopper control circuit in FIG. 1.

The chopper control circuit 20 constituted as described above will be explained in more detail with reference to FIG. 3. The pulse generator circuit 30 shown in FIG. 3 is a relaxation oscillator which comprises a unijunction transistor (UJT) 40, a charging and discharging capacitor 42, a resistor 44 through which the capacitor 42 is supplied from a positive terminal 46 of the main source, a resistor 48 for connecting the base 2 of UJT 40 to the positive terminal 46, and a resistor 50 for connecting the base 1 of UJT 40 to the earth. Output pulse A of the relaxation oscillator 30 is delivered out of a junction between the base 1 of UJT 40 and the resistor 50 and supplied to the monostable multivibrator 32. The monostable multivibrator 32 comprises a saw-tooth wave generator circuit 52 for generating a saw-tooth wave signal B as shown in FIG. 2 which falls when the pulse A is received, and a comparator 54 which compares the saw-tooth wave signal with the level of the accelerator signal from accelerator signal generator circuit 36 to produce the rectangular wave signal C. The saw-tooth wave generator circuit 52 comprises a charging and discharging capacitor 56, a resistor 58 through which the current is supplied to the capacitor 56, and a switching transistor 64 which is turned on by the pulse A fed to its base from the pulse generator circuit 30 via a resistor 60 thereby to discharge via a resistor 62 an electric charge which has been stored in the capacitor 56. The saw-tooth wave signal B developing across the capacitor 56 is fed to the comparator 54. The comparator 54 in the form of an operational amplifier with a positive feedback line via a resistor 66 is fed by the saw-tooth wave signal B at its negative input terminal and by the accelerator signal from the accelerator signal generator 36 at its positive terminal. If the level of an accelerator signal is $V_a$ as shown at two dot chain line associated with the saw-tooth wave signal B of FIG. 2, during an interval in which the level of the saw-tooth wave signal B is lower than the level $V_a$, the output of the comparator 54 is maintained at a high level. But, as soon as the increasing saw-tooth wave signal B reaches the accelerator signal level $V_a$, the output of the comparator 54 rapidly falls to a low level by the action of the positive feedback resistor 66 and this low level is maintained until the saw-tooth wave signal falls down. Accordingly, the output of the comparator 54 i.e., of the monostable multivibrator 32 takes the form of a rectangular wave signal C as shown in FIG. 2. The interval within which the rectangular wave signal remains at the high level corresponds to a semi-stable interval $\tau$ of the monostable multivibrator 32. The rectangular wave signal C is fed to the pulse forming circuit 34. The pulse forming circuit 34 comprises a first pulse forming circuit 70 for producing the pulse D at an instant of the rise of rectangular wave signal C and a second pulse forming circuit 72 for producing the pulse E at an instant of the fall of rectangular wave signal C. In the first pulse forming circuit 70, there is incorporated a differential circuit including resistors 74 and 76 and a capacitor 78 and producing a pulse in response to the rising rectangular wave signal C so that a pulse current is passed instantly through the primary winding of a pulse transformer 82. At this instant, across the secondary winding of the pulse transformer 82 is induced the pulse D which in turn is delivered via a diode 84 to a terminal 86 connected with the gate of the thyristor 8 shown in FIG. 1. A terminal 88, on the other hand, is connected with the cathode of the thyristor 80. At the instant that the transistor 80 is turned off, a counter electromotive force develops across the primary winding of the pulse transformer 82 but it is suppressed by a diode 90 so as not to affect the transistor 80 adversely. The second pulse forming circuit 72 comprises the same circuit 92 as the first pulse forming circuit 70, and a phase inverter circuit preceding the circuit 92 and including resistors 94 and 96 for dividing the rectangular wave signal C, a transistor 98 for phase-inverting a divided rectangular wave signal and a resistor 100 connected with the collector of the transistor 98 for picking up the inverted rectangular wave signal. Accordingly, a rectangular wave signal analogous to the inverted rectangular wave signal C is produced at a junction between the collector of transistor 98 and the resistor 100 so that the pulse E responsive to the falling rectangular wave signal C is produced between terminals 102 and 104 of the circuit 92. The terminal 102 is connected with the gate of the thyristor 10 shown in FIG. 1 and the terminal 104 is connected with its cathode. Consequently, the thyristor 8 is conductive during the interval in which the signal F of FIG. 2 stays at a high level.

Figure 5:
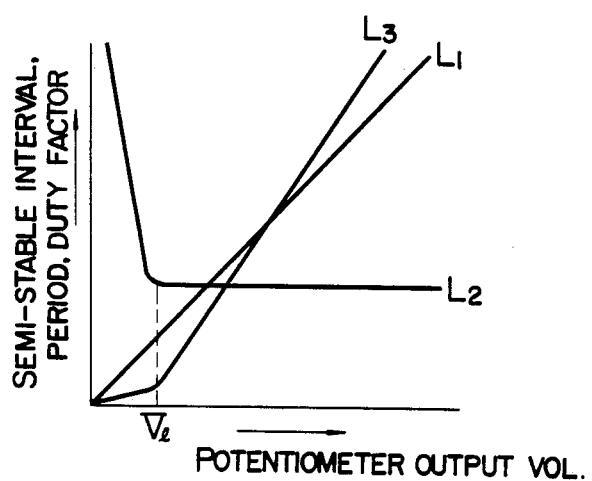
FIG. 5 is a graphic representation showing chopper control characteristics in relation to the potentiometer output voltage.

The interval $\tau$ of the semi-stable state of monostable multivibrator 32 is expressed as $$\tau = CR \log [V/(V - V_a)],$$

where C represents capacitance of the capacitor 56, R resistance of the resistor 58, V supply voltage fed to the terminal 46 and $V_a$ accelerator signal level. As will be understood from this equation, the semi-stable interval $\tau$ varies with the accelerator signal level $V_a$. For example, if the accelerator signal level increases to a value $V_a'$ as shown in the saw-tooth wave signal B of FIG. 2, the semi-stable interval $\tau$ is prolonged to a value $\tau'$. As a result, the production of the pulse E is delayed as indicated by a chained line figure so that the conduction interval of the thyristor 8 is prolonged as indicated by a chained line in the waveform F of FIG. 2. If the monostable multivibrator is designed to operate within a relatively linear range of changing curve by the capacitor 56 and resistor 58, its semi-stable interval $\tau$ will vary linearly, as shown at curve $L_1$ in FIG. 5, in accordance with the accelerator signal level $V_a$.

Figure 4:
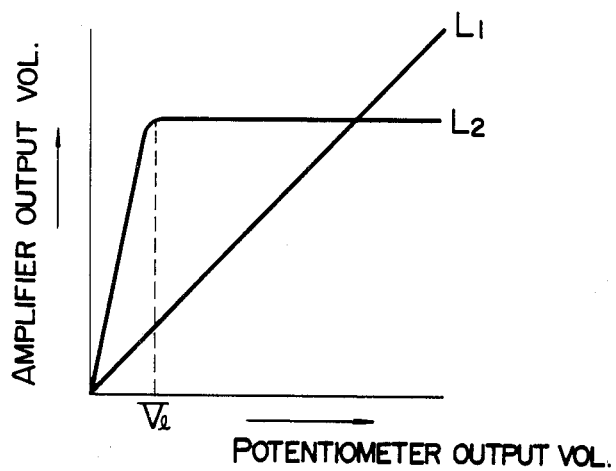
FIG. 4 is a graphic representation showing input output characteristics of two amplifiers incorporated in an accelerator signal generator in FIG. 3.

Returning now to FIG. 3, the accelerator signal generator 36 comprises a potentiometer 106 connected across the D.C. supply source terminals and having a movable contact 108 cooperative with an accelerator pedal, a linear amplifier 110 for linearly amplifying an output voltage from the potentiometer 106 as shown at curve $L_1$ in FIG. 4, and an amplifier 112 which, as shown at curve $L_2$ in FIG. 4, amplifies the output voltage of the potentiometer 106 linearly as long as that output voltage is small but is saturated with the increase of the potentiometer output voltage exceeding a certain value $V_l$. Since the linear amplifier 110 supplies a voltage linearly proportional to the amount of depression of the accelerator pedal to the positive input terminal of comparator 54, the pulse E is rendered leading or lagging in proportion to the amount of the depression. This results to variations in the duty factor of the thyristor 8 which are proportional to the amount of the depression of the accelerator pedal so that rotation speeds of the motor 2 may be controlled by the amount of the depression. In this manner, it is possible to control the duty factor over the entire range, that is, from approximate zero % to 100%.

The output of the amplifier 112 having input-output characteristics as shown at curve $L_2$ in FIG. 4 is fed via a diode 114 and a resistor 116 to the junction between the charging and discharging capacitor 42 and the resistor 44. The charging and discharging capacitor 42 is charged by both currents respectively fed from the positive terminal 46 of D.C. supply source via the resistor 44 and from the amplifier 112 via the diode 114 and resistor 116. As long as the output voltage of the potentiometer 106 exceeds the value $V_l$, the amplifier 112 delivers a fixed voltage and accordingly, the pulse generator circuit 30 delivers an output pulse at a fixed period. However, as the output voltage of potentiometer 106 decreases below the value $V_l$, the amplifier 112 delivers an output voltage which varies in proportion to the potentiometer output voltage, thereby the period of output pulse from the pulse generator circuit 30 being varied in accordance with the level of potentiometer output voltage. As a result, the pulse generator circuit 30 delivers output pulses at a period as shown at curve $L_2$ in FIG. 5. In this manner, since the conduction duration of the thyristor 8 is linearly proportioned to the potentiometer output voltage as shown at curve $L_1$ in FIG. 5 and the repetition period thereof bears a characteristic as shown at curve $L_2$ in FIG. 5, the duty factor of the thyristor 8 varies with the potentiometer output voltage, as shown at curve $L_3$ in FIG. 5, at a small rate when the potentiometer output voltage is below the value $V_l$ but at a fixed rate larger than the small rate when the potentiometer output voltage exceeds the value $V_l$. This means that the running speed can be adjusted accurately and readily by the accelerator pedal when electric vehicle is operated at a low speed.

The diode 114 serves to prevent the electric charge, fed to the capacitor 42 from the supply source terminal 46 via the resistor 44, from being discharged via resistors 116, 118 and 120 even when the potentiometer output voltage falls to zero or approximate zero, thereby maintaining the pulse generator circuit to oscillate. The diode 114 also makes the operation of amplifier 112 immune to variations in terminal voltage across the capacitor 42.

Figure 6:
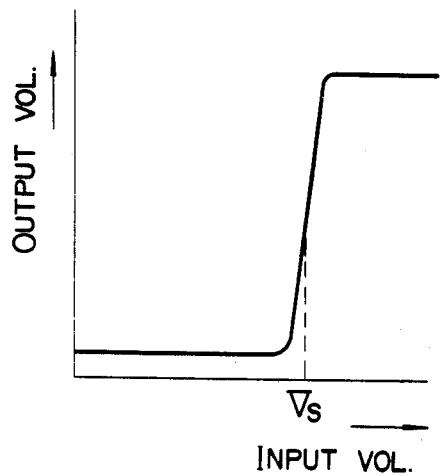
FIG. 6 is a graphic representation showing input output characteristics of an amplifier incorporated in a current limiter circuit.

The current limiter circuit 38 picks up at its input terminal 122 a voltage developing across the resistor 28 connected in series with the motor 2. This voltage is amplified at an amplifier 124 and applied to a positive input terminal of a comparator 126. Applied to a negative input terminal of the comparator 126 is a reference voltage $V_s$ which is obtained by dividing a voltage at a positive terminal 128 of D.C. supply source or constant voltage source by means of resistors 130 and 132. The comparator 126 is provided with a negative feedback resistor 134 having a relatively large resistance. Therefore, the comparator 126 has input-output characteristics as shown in FIG. 6 wherein the output is varied continuously at a large gradient with input voltages from the positive input terminal in the vicinity of the reference voltage $V_s$. A transistor 136 is varied in its emitter-collector impedance dependent on the output of the comparator 126. In normal operation of the motor 2 operated with a proper amount of current, the input voltage to the comparator 126 proportional to the terminal voltage across the resistor 28 is far smaller than the reference voltage $V_s$ with the result that the output of the comparator 126 is maintained at a low level to cause the transistor 136 to bear a sufficiently large impedance, thereby the output of the potentiometer 106 being kept undisturbed. Where the electric vehicle is accelerated to a great extent or stopped running because of some troubles, an excessive current is passed through the motor 2 and it sometimes happens that the chopper 6 fails the commutation and that the field coil and the like are burnt out. In such an event, according to the invention, the comparator 126 receives an input voltage exceeding the reference voltage $V_s$ and delivers a rapidly increased output voltage to decrease the impedance of the transistor 136. Consequently, the output voltage of potentiometer 106 is decreased to decrease the duty factor of the thyristor 8 so that the current flowing through the motor 2 is reduced. In other words, the motor current is controlled such that the input voltage to the comparator 126 bears values in the vicinity of the reference voltage $V_s$.

I claim:

1. A speed control system for a traction motor for an electric vehicle comprising:

a D.C. supply source for supplying a D.C. voltage to the traction motor;

a chopper for chopping the voltage to be fed to the traction motor; and, a chopper control circuit for controlling the duty factor of the voltage which is fed through the chopper, said chopper control circuit including:

a pulse generator circuit for generating pulses periodically, a signal generator circuit comprising means for producing a D.C. signal which is varied in response to an adjusting operation for running speed of the electric vehicle, and an amplifier for amplifying the D.C. signal to produce an output which prolongs the pulse generation period at the pulse generator circuit in accordance with an operation for decreasing the running speed, and a monostable multivibrator which is set to a semi-stable state by the pulse generator circuit to produce a rectangular wave signal whose semi-stable duration is controlled by the D.C. signal fed from the signal generator circuit, said chopper being controllable by the rectangular wave signal from the monostable multivibrator, said monostable multivibrator including a saw-tooth wave signal generator circuit for generating a saw-tooth wave signal which is returned to an initial value by the pulse from the pulse generator circuit, and a comparator which compares the saw-tooth wave signal from the saw-tooth wave generator circuit with the D.C. signal generator circuit to produce a rectangular wave signal which is set when the saw-tooth wave signal is returned to the initial value and reset when the saw-tooth wave signal coincides with the D.C. signal during ramping of the saw-tooth wave signal.

2. The system according to claim 1, wherein said amplifier has a large amplification degree such that the output of the amplifier is varied by variations in the D.C. signal during operation of the electric vehicle at a low speed and is fixed during the operation at an intermediate and a high speed.

* * * * *